(12) United States Patent
Sato et al.

(10) Patent No.: US 7,982,627 B2
(45) Date of Patent: Jul. 19, 2011

(54) METER DEVICE, INFORMATION PROCESSING DEVICE, AND METER DRIVING METHOD

(75) Inventors: Hiroyuki Sato, Kanagawa (JP); Yoko Kuzuoka, Tokyo (JP); Kiyoshi Suzuki, Chiba (JP); Wei Keat Yew, Penang (ML)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 12/116,602

(22) Filed: May 7, 2008

(65) Prior Publication Data
US 2009/0256716 A1 Oct. 15, 2009

(30) Foreign Application Priority Data
Apr. 15, 2008 (JP) .................. 2008-105979

(51) Int. Cl.
*G08B 5/00* (2006.01)
(52) U.S. Cl. .................. 340/691.1; 340/691.6; 340/692; 340/693.1; 340/330; 381/150; 381/151; 381/152; 381/337; 310/300; 310/309
(58) Field of Classification Search .............. 340/691.1, 340/691.6, 692, 693.1, 330; 381/150; 310/300; 367/140
See application file for complete search history.

(56) References Cited

U.S. PATENT DOCUMENTS

| | | | |
|---|---|---|---|
| 3,991,628 A * | 11/1976 | Narita ............................. | 73/647 |
| 4,528,501 A * | 7/1985 | Dorrough et al. .......... | 324/103 P |
| 6,853,162 B2 * | 2/2005 | Betts et al. ................... | 318/696 |
| 2006/0136080 A1 * | 6/2006 | Williams et al. ............... | 700/94 |

* cited by examiner

*Primary Examiner* — George A Bugg
*Assistant Examiner* — Sisay Yacob
(74) *Attorney, Agent, or Firm* — Frommer & Lawrence & Haug LLP; William S. Frommer; Paul A. Levy (57) ABSTRACT

A meter device includes an indicator unit, movably supported within a predetermined range, for representing an amplitude value of an input signal by a movement amount $\Delta\theta$ from a reference position $\theta 0$ which is one end of the predetermined range. A gain acquiring unit acquire a gain of the input signal; and a maximum movement amount determining part determines a maximum movement amount $\Delta\theta M$ of the indicator unit at the gain based on the gain acquired by the gain acquiring unit. A drive control unit moves the indicator unit to a position corresponding to the amplitude value of the input signal between the reference position $\theta 0$ and a maximum movement position $\theta M$ moved from the reference position $\theta 0$ by the maximum movement amount $\Delta\theta M$ based on the maximum movement amount $\Delta\theta M$ determined by the maximum movement amount determining part and the amplitude value of the input signal.

9 Claims, 6 Drawing Sheets

METER DEVICE, INFORMATION PROCESSING DEVICE, AND METER DRIVING METHOD

FIELD OF THE INVENTION

The present invention relates to a meter device for displaying a predetermined value by moving an indicator unit, an information processing device, and a meter driving method.

BACKGROUND OF THE INVENTION

A meter is arranged in an audio reproducing apparatus or the like, and an amplitude value (volume level) of the audio signal to be reproduced is displayed by the meter. The meter is mainly classified into analog form and digital form. The meter of analog form displays the volume level by the position of an indication needle (indicator needle), and the like. The meter of digital form displays a predetermined display or a numerical value representing the volume level on a display unit. A meter disclosed in Patent Document 1 is an example of the meter of analog form, and meters disclosed in Patent Document 2 and Patent Document 3 are examples of the meter of digital form. The term "analog form" and the "digital form" referred to herein do not refer to whether the audio signal to be input to the meter is analog or digital, but refer to the display form used by the meter when notifying the audio signal to the user.

Most users are familiar with the meter of analog form rather than the meter of digital form, and can intuitively recognize the volume with the meter of analog form. Therefore, many users prefer the meter of analog form over the meter of digital form even in recent years where digitization is advancing.

Most meters of analog form are configured by a simple structure including a coil and a magnet. In this case, the audio signal (current) is flowed to the coil, so that the indication needle moves to a predetermined position by the mutual action between the magnetic field generated in the coil and the magnetic field with the magnet.

RELATED DOCUMENTS

[Patent Document 1] Japan Patent Application Laid-Open No. 2-138878
[Patent Document 2] Japan Patent Application Laid-Open No. 5-275945
[Patent Document 3] Japan Patent Application Laid-Open No. 64-10483

OBJECTS OF THE INVENTION

However, in such coil type meter, it is difficult to control the mutual action between the magnetic field generated in the coil and the magnetic field with the magnet at satisfactory precision, and thus it is difficult to control the stopping position of the indication needle. Furthermore, since the indication needle swings according to the amplitude value of the audio signal flowing to the coil, the indication needle completely swings to the end when the audio signal having a large amplitude value is input. Although the amplitude value of the audio signal is amplified by an amplifier and the like, even if the gain of the amplifier is changed, the meter is not able to display the signal level of the relevant audio signal unless the audio signal is actually is flowed.

The present invention addresses the above-identified issues, and desirably aims to provide a new and improved meter device capable of controlling the stopping position at a satisfactory precision in conjunction with the gain of the input signal, an information processing device, and a meter driving method.

SUMMARY OF THE INVENTION

According to an embodiment of the present invention, there is provided a meter device including an indicator unit, movably supported within a predetermined range, for representing an amplitude value of an input signal by a movement amount from a reference position which is one end of the predetermined range; a gain acquiring unit for acquiring a gain of the input signal; a maximum movement amount determining part for determining a maximum movement amount of the indicator unit at the gain based on the gain acquired by the gain acquiring unit; and a drive control unit for moving the indicator unit to a position corresponding to the amplitude value of the input signal between the reference position and a maximum movement position moved from the reference position by the maximum movement amount based on the maximum movement amount determined by the maximum movement amount determining part and the amplitude value of the input signal.

According to such configuration, the gain of the input signal is acquired by the gain acquiring unit, and the maximum movement amount of the indicator unit is determined based on the gain by the maximum movement amount determining part. The indicator unit is moved by the drive control unit to a position corresponding to the amplitude value of the input signal within a movable predetermined range and between a reference position and a maximum movement position moved from the reference position by the maximum movement amount based on the maximum movement amount and the amplitude value of the input signal. In other words, the indicator unit is moved between the reference position and the maximum movement position, which maximum movement position is determined based on the gain of the input signal. Therefore, not only the amplitude value of the audio signal, but the gain of the audio signal can also be represented by the position of the indicator unit. The indicator unit can be more accurately moved to the gain corresponding to the audio signal as the drive control unit moves the indicator unit based not only on the amplitude value but also on the gain.

Furthermore, a stepping motor for moving the indicator unit is further arranged; wherein the drive control unit moves the indicator unit by outputting a drive signal to the stepping motor by a predetermined number of steps.

Moreover, when the gain acquired by the gain acquiring unit is changed and the maximum movement amount determined by the maximum movement amount determining part is changed, the drive control unit moves the indicator unit once to a maximum movement position moved from the reference position by the maximum movement amount.

Furthermore, at least two sensors, respectively arranged at the reference position or one end of the predetermined range and the other end of the predetermined range, for detecting that the indicator unit reached one end or the other end of the predetermined range; and a step number determining part for providing a drive signal to the stepping motor and moving the indicator unit in the predetermined range in time of activation, and determining the number of steps of the stepping motor necessary for moving the indicator unit by a predetermined amount based on the detection results of the at least two sensors and the provided drive signal are further arranged.

Furthermore, an input signal selecting unit for selecting an input signal to be displayed by the indicator unit from a plurality of input signals is further arranged; wherein when a gain on the input signal selected by the input signal selecting unit is not acquired by the gain acquiring unit, the drive control unit moves the indicator unit to a position corresponding to the amplitude value of the input signal between the ends of the predetermined range based on the amplitude value of the input signal selected by the input signal selecting unit.

According to another embodiment of the present invention, there is provided an information processing device including a reproducing unit for reproducing a voice; an amplification unit for amplifying the audio signal reproduced by the reproducing unit; an indicator unit, movably supported within a predetermined range, for representing an amplitude value of the audio signal amplified by the amplification unit by a movement amount from a reference position which is one end of the predetermined range; a gain acquiring unit for acquiring a gain of the audio signal from the amplification unit; a maximum movement amount determining part for determining a maximum movement amount of the indicator unit at the gain based on the gain acquired by the gain acquiring unit; and a drive control unit for moving the indicator unit to a position corresponding to an amplitude value of the audio signal between the reference position and a maximum movement position moved from the reference position by the maximum movement amount based on the maximum movement amount determined by the maximum movement amount determining part and the amplitude value of the audio signal.

Moreover, an input signal acquiring unit for acquiring a plurality of input signals including the audio signal; and an input signal selecting unit for selecting an input signal to be displayed by the indicator unit from the plurality of input signals acquired by the input signal acquiring unit are arranged; wherein when the input signal selecting unit selects an input signal other than the audio signal, the drive control unit moves the indicator unit to a position corresponding to the amplitude value of the input signal between the ends of the predetermined range based on the amplitude value so as to display the amplitude value of the input signal selected by the input signal selecting unit on the indicator unit.

Furthermore, the input signal acquiring unit acquires, from an recording medium arranged inside or outside the information processing device, an input signal in which a used capacity of the recording medium is represented with an amplitude value; and when the input signal selecting unit selects the input signal in which the used capacity of the recording medium is represented with the amplitude value, the drive control unit moves the indicator unit to a position corresponding to the used capacity of the recording medium between the ends of the predetermined range based on the input signal.

According to another embodiment of the present invention, there is provided a meter driving method including the steps of acquiring a gain of an input signal; determining a maximum movement amount of an indicator unit, which is movably supported within a predetermined range for representing an amplitude value of the input signal by a movement amount from a reference position which is one end of the predetermined range, based on the gain acquired in the gain acquiring step; and moving the indicator unit to a position corresponding to the amplitude value of the input signal between the reference position and a maximum movement position moved from the reference position by the maximum movement amount based on the maximum movement amount determined in the maximum movement amount determining step and the amplitude value of the input signal.

According to the embodiments of the present invention described above, the stopping position can be controlled at satisfactory precision in conjunction with the gain of the input signal.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A meter device according to one embodiment of the present invention can be applied to various apparatuses to indicate various input signals. Apparatuses that can be applied with the meter devices are merely apparatuses transmitted with a predetermined signal which amplitude value changes, and in particular, are desirably apparatuses capable of reproducing audio. Such apparatuses include display device such as analog or digital television; recording/reproducing apparatuses such as video tape, cassette tape DAT (Digital Audio Tape), record, HDD (Hard Disk Drive), DVD (Digital Versatile Disc), CD (Compact Disc), MD (Mini Disk), and MO (Magneto Optical); radio, portable telephone, computer, PDA (Personal Digital Assistant) capable of receiving radio broadcast/television broadcast or reproducing recorded content; and other apparatuses such as audio reproducing/recording apparatus. For the sake of convenience of the explanation, a case in which the meter device according to one embodiment of the present invention is applied to the audio reproducing apparatus will be described below.

Audio Reproducing Apparatus

Figure 1:
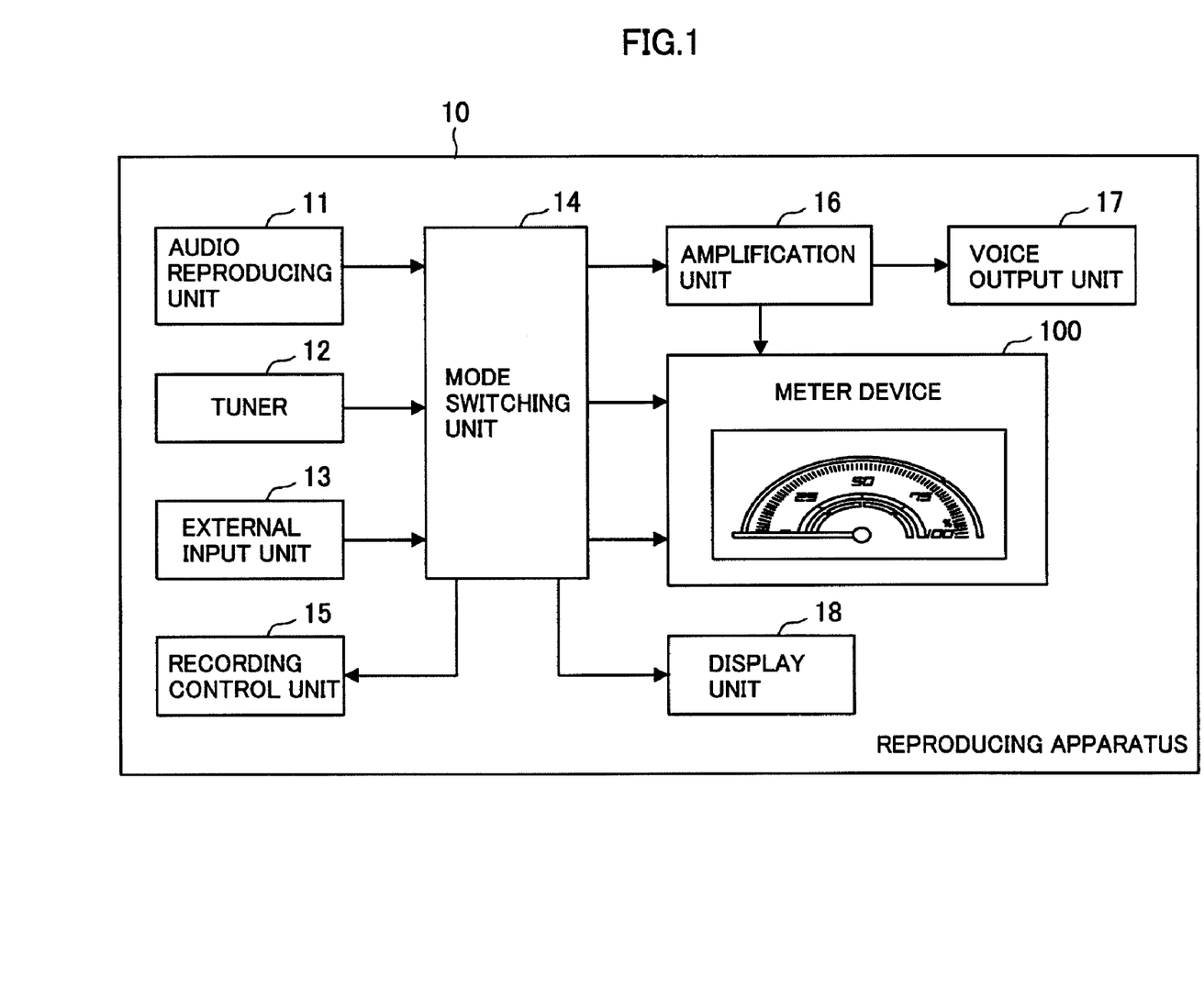
FIG. 1 is an explanatory view describing an outline of a reproducing apparatus according to one embodiment of the present invention.

First, an outline of an audio reproducing apparatus applied with the meter device according to one embodiment of the present invention will be described with reference to FIG. 1. FIG. 1 is an explanatory view describing the outline of the reproducing apparatus according to the present embodiment.

As shown in FIG. 1, the reproducing apparatus 10 according to the present embodiment includes an audio reproducing unit 11, a tuner 12, an external input unit 13, a mode switching unit 14, a recording control unit 15, an amplification unit 16, a voice output unit 17, a display unit 18, and a meter device 100.

The audio reproducing unit 11 is one example of a reproducing unit that reads out audio data recorded on a recording medium, and reproduces the audio signal. The recording medium may be connected or inserted from outside the reproducing apparatus 10, or may be built in the reproducing apparatus 10.

Recording medium inserted from the outside includes magnetic tapes such as video tape, cassette tape, and DAT; magnetic discs such as flexible disc; optical discs such as various CD, MO, DVD, and MD; and records. In this case, the audio reproducing unit 11 may be a driver of each recording medium.

Recording medium connected from the outside includes HDD (Hard Disk Drive), ROM (Read Only Memory), RAM (Random Access Memory), semiconductor memory, and the like. In this case, the audio reproducing unit 11 reads out and reproduces recorded data from each connected recording medium.

The recording medium built in the reproducing apparatus 10 includes HDD, ROM, RAM, semiconductor memory, and the like. In this case, the audio reproducing unit 11 reads out and reproduces recorded from each built-in recording medium.

The audio reproducing unit 11 may acquire audio data from network such as Internet. The term "audio signal" referred to herein refers to voice signal, or the like voice output from the voice output unit 17, to be hereinafter described; and the term "audio data" refers to voice information, or the like containing the audio signal. In other words, the audio data contains voice signal, and the audio signal is generated by reading out the audio data. The audio data and the audio signal are converted by an appropriate digital/analog converter or an analog/digital converter (not shown) whether in analog form or digital form, but description on the conversion of signal transmission form will be omitted for the sake of convenience of the explanation.

The tuner 12 is one example of a reproducing unit that receives broadcast data that contains audio data and that is wired or wirelessly transmitted. The broadcast data being received by the tuner 12 may be analog broadcast or digital broadcast, may be radio television broadcast, cable television broadcast, wireless radio broadcast, wired radio broadcast, and the like. The tuner 12 reproduces the audio signal by performing processes such as frequency selection and decoding on the received broadcast data.

The external input unit 13 is one example of a reproducing unit that acquires the audio signal from outside. That is, the external input unit 13 is connected to an external audio reproducing apparatus, tuner, microphone, and the like to acquire and reproduce the audio signal input therefrom. A case of acquiring the audio signal from the outside is also included in the reproduction of the audio signal herein for the sake of convenience of the explanation.

Therefore, the reproducing apparatus 10 according to the present embodiment can acquire audio data or audio signal from various sources (sound source), and reproduce the audio signal. Here, the source, that is, the acquiring destination of the audio signal includes recording medium, network, broadcast signal, external device, and the like, but the present invention is not limited to such examples, and needless to say, reproducing unit of various modes can be arranged. Each configuration (audio reproducing unit 11, tuner 12, external input unit 13, and the like) for reproducing the audio signal is hereinafter collectively termed as "reproducing unit".

The mode switching unit 14 switches the operation mode of the reproducing apparatus 10. The operation mode is broadly classified into reproduction mode, recordation mode, and display mode.

In the reproduction mode, the mode switching unit 14 first acquires the audio signal reproduced in the audio reproducing unit 11, the tuner 12, the external input unit 13, and the like. The mode switching unit 14 then selects at least one audio signal according to the set mode, and outputs the same to the amplification unit 16, or the like to voice output the audio signal.

In the recordation mode, the mode switching unit 14 first acquires the audio signal reproduced in the audio reproducing unit 11, the tuner 12, the external input unit 13, and the like. The mode switching unit 14 then selects at least one audio signal according to the set mode, and outputs the same to the recording control unit 15 to record on the recording medium.

The display mode is a mode for setting information to be displayed on the meter device 100, and can be simultaneously set with the reproduction mode or the recordation mode. As described below, the meter device 100 can acquire a plurality of input signals, where in the display mode, the input signal to be displayed on the meter device 100 can be selected from the plurality of input signals.

Mode switching by the mode switching unit 14 may be performed according to the operation of the user, or may be automatically performed according to the reproduction state of each reproducing unit.

The reproduction mode and the recordation mode are both further segmentalized according to the source of the recording destination of the audio signal to be used. The display mode is also segmentalized according to the input signal to be displayed.

Segmentalization of the reproduction mode and the recordation mode will be more specifically described below. The reproduction mode is segmentalized into plural modes according to the source of the audio signal to be voice output such as "recording medium reproduction mode", "Internet reproduction mode", "broadcast reception reproduction mode (radio mode, television mode, and the like), "external input reproduction mode", and the like. Similarly, the recordation mode is segmentalized into plural modes according to the recording medium to be recorded with the audio signal such as "recording medium recordation mode", "Internet recordation mode", "broadcast reception recordation mode (radio mode, television mode, and the like), "external input recordation mode", and the like.

The recording control unit 15 records the audio signal on the recording medium, or the like. That is, when the mode switching unit 14 sets the recordation mode, the recording control unit 15 acquires the audio signal reproduced in one or more of the audio reproducing unit 11, the tuner 12, and the external input unit 13 from the mode switching unit 14. The recording control unit 15 records the acquired audio signal on the recording medium, or the like corresponding to the set mode. The recording medium includes recording medium similar to that from which the audio reproducing unit 11 reproduces the audio signal. That is, the audio reproducing unit 11 can reproduce the audio signal from the CD, the recording control unit 15 can record such audio signal on the semiconductor memory connected from outside, and the like. In this case, the audio signal to be recorded by the recording control unit 15 may be amplified and then recorded.

The amplification unit 16 acquires the audio signal from the mode switching unit 14, and amplifies the amplitude value of the audio signal at a predetermined gain. The gain corresponds to the volume level (volume), and can be changed in response to the operation of the user.

The voice output unit 17 voice outputs the audio signal amplified by the amplification unit 16. That is, the voice output unit 17, configured by speaker, earphone, head phone, and the like outputs voice and provides the voice corresponding to the audio signal to the user as sound.

The display unit 18 notifies the operation state of the reproducing apparatus 10 to the user by performing a predetermined display according to the operation of the reproducing apparatus 10.

The meter device 100 is a meter for displaying in analog form the amplitude value of the input signal including audio signal. That is, the meter device 100 notifies the amplitude value of the input signal to the user by rotating an indication needle 102 according to the amplitude value of the input signal.

The meter device 100 according to the present embodiment provides various information to the user by representing the amplitude value of various input signals. The information displayed by the meter devices includes, for instance, the volume level of the audio signal, gain of the audio signal, the elapsed time of the content of the audio data being reproduced by the audio reproducing unit 11, used capacity and remaining capacity of the recording medium from which the audio reproducing unit 11 is acquiring the audio data and recording medium to which the recording control unit 15 is records the audio signal, progress state of recordation on the recording medium by the recording control unit 15, frequency band of the broadcast wave being received by the tuner 12, and the like.

When displaying the volume level, the meter device 100 acquires the amplified audio signal from the amplification unit 16 or acquires the audio signal from the mode switching unit 14 as input signal. In this case, the meter device 100 acquires the gain from the amplification unit 16 to display the gain along with the volume level.

When displaying the elapsed time of the reproducing content, the meter device 100 acquires a signal representing the elapsed time from the audio reproducing unit 11 as input signal, for example, a signal having the reproducing time of the reproducing content as a maximum value and the elapsed time as the amplitude value, a signal (also referred to as "elapsed time signal") representing the proportion of elapsed time with respect to the reproducing time of the reproducing content with amplitude value, and the like.

When displaying the used capacity and the remaining capacity of the recording medium, the meter device 100 acquires a signal representing the used capacity, or the like from the audio reproducing unit 11 or the recording control unit 15 as input signal, for example, a signal having a maximum storage capacity of the recording medium as a maximum value and the used capacity as the amplitude value, a signal (also referred to as "used capacity signal") representing the proportion of the used capacity with respect to the maximum storage capacity of the recording medium with amplitude value, and the like.

When displaying the progress state of recordation, the meter device 100 acquires a signal representing the progress state from the recording control unit 15 as input signal, for example, a signal having a capacity of the recording content as a maximum value and the recorded capacity of the content as the amplitude value, a signal (also referred to as "progress state signal") representing the proportion of the recorded capacity with respect to the capacity of the recording content with amplitude value, and the like.

When displaying the received frequency band, the meter device 100 acquires a signal representing the received frequency band from the tuner 12 as input signal, for example, a signal having a receivable maximum frequency as a maximum value and the received frequency as the amplitude value, a signal (also referred to as "received frequency signal") representing the proportion of the received frequency with respect to the maximum frequency with amplitude value, and the like.

The meter device 100 according to the present embodiment acquires such input signals through the mode switching unit 14, but may directly acquire the input signal from each configuration. The meter device 100 further acquires mode information representing the mode further set by the mode switching unit 14.

Configuration of Meter Device 100

Figure 2:
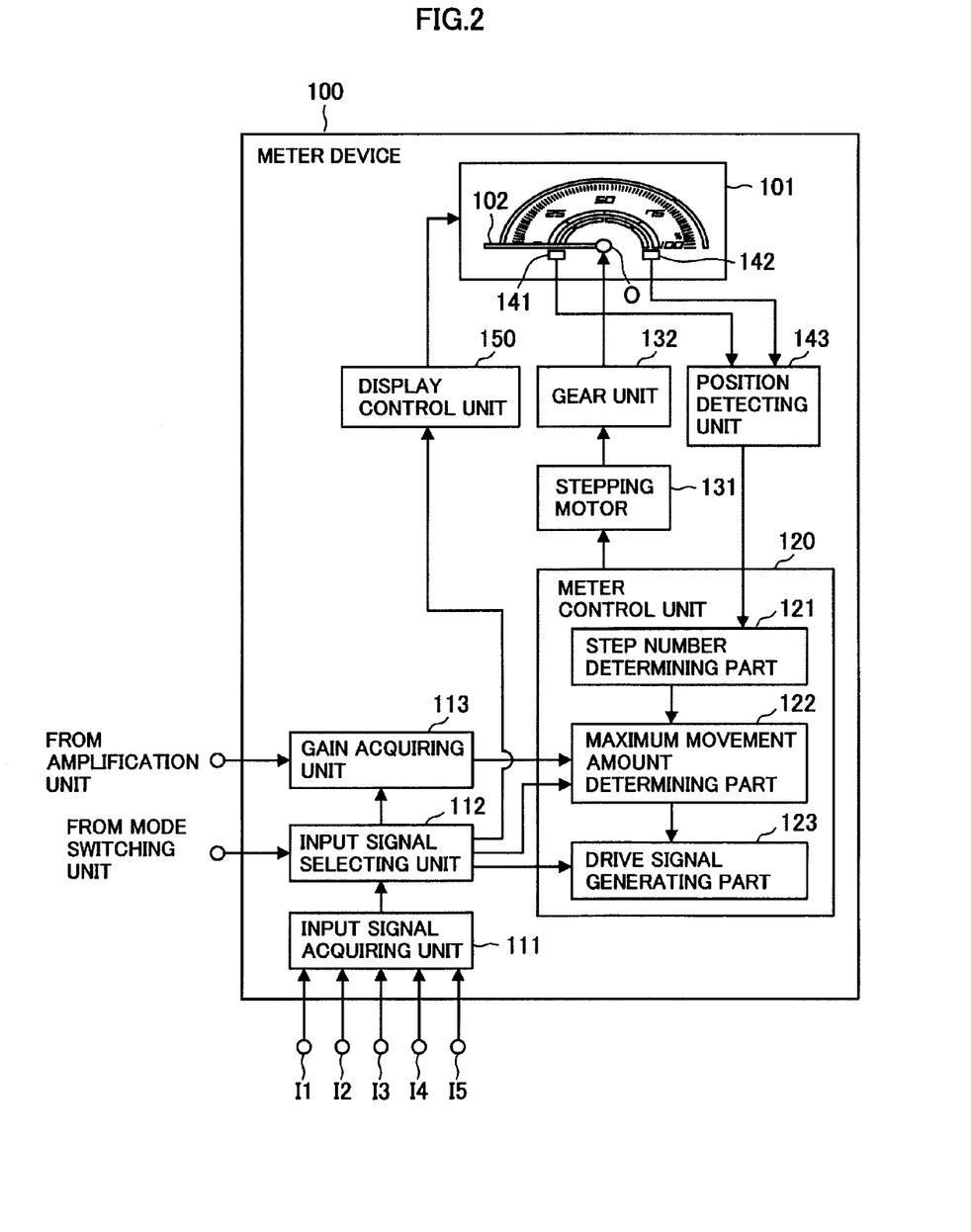
FIG. 2 is an explanatory view describing a configuration of the meter device according to the embodiment.

The detailed configuration of the meter device 100 according to one embodiment of the present invention will now be described with reference to FIG. 2. FIG. 2 is an explanatory view describing a configuration of the meter device according to the present embodiment.

As shown in FIG. 2, the meter device 100 includes, as a display unit for displaying the amplitude value of the input signal, a meter display unit 101, an indication needle 102, an input signal acquiring unit 111, an input signal selecting unit 112, a gain acquiring unit 113, a meter control unit 120, a stepping motor 131, a gear unit 132, sensors 141, 142, a position detecting unit 143, and a display control unit 150.

Figure 4:
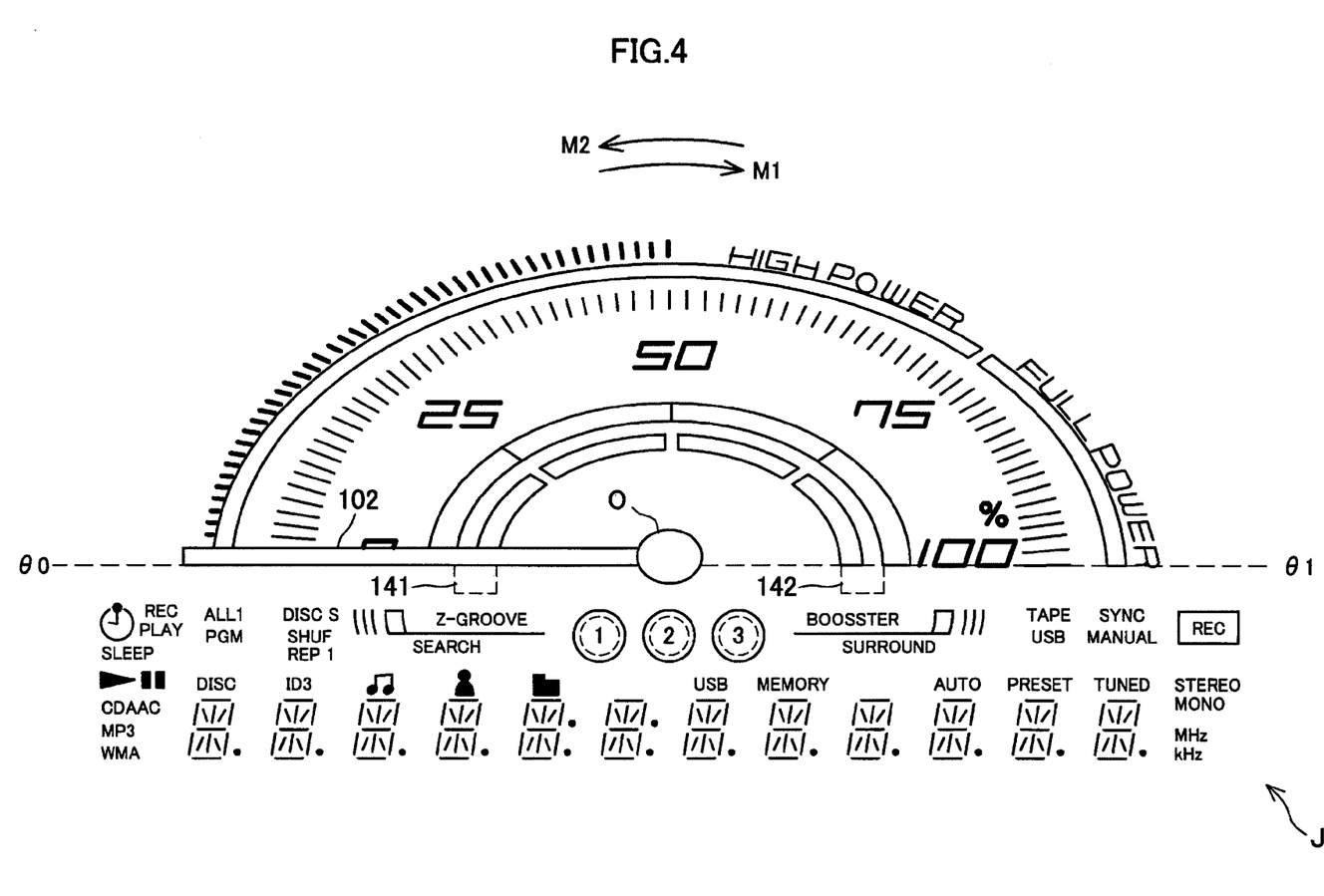
FIG. 4 is an explanatory view describing the movement of the indication needle by the meter device according to the embodiment.

The meter display unit 101 is one example of a dial plate of the meter. The meter display unit 101 is displayed with predetermined numbers, characters, symbols, and the like, so that the user is able to recognize the amplitude value etc. of the input signal by looking at the number, character, symbol, and the like displayed at the position pointed by the indication needle 102. As shown in FIG. 4, the meter display unit 101 includes a predetermined display region J other than a rotatable range of the indication needle 102. The meter display unit can display information on the display region J to provide such information to the user. The information displayed on the display region J includes operation state and set mode of the reproducing apparatus 10, progress state of the audio signal being reproduced or recorded, frequency band of broadcast being received by the tuner 12, used capacity of the recording medium, and the like. The meter display unit 101 can also provide illumination by flashing lights of various colors, or the like.

The indication needle 102 is one example of an indicator unit that is indicated to be rotatable within a predetermined range with a center O as the rotation axis, and moves by the rotation amount corresponding to the amplitude value of the input signal, as shown in FIG. 4. The predetermined range that the indication needle 102 can rotate is also referred to herein as "rotatable range", where one end (starting end position) of the rotatable range is also referred to as "reference position θ0" and the other end is also referred to as "terminating end position θ1". As shown in FIG. 4, calibrations such as "0%, 25%, 50%, 75%, and 100%" are marked at predetermined positions within the rotatable range of the indication needle 102 in the meter display unit 101. Thus, the indication needle 102 points to the calibration of the corresponding position when moved by the rotation amount corresponding to the amplitude value of the input signal. The user referencing the indication needle 102 and the meter display unit 101 then can recognize the amplitude value of the input signal.

The input signal acquiring unit 111 acquires a plurality of input signals. The input signal includes audio signal I1, elapsed time signal I2, used capacity signal I3, progress state signal I4, received frequency signal I5, and the like.

The input signal selecting unit 112 selects an input signal for displaying the amplitude value on the indication needle 102 from the plurality of input signals acquired by the input signal acquiring unit 111. In this case, the input signal selecting unit 112 acquires mode information from the mode switching unit 14, and selects the input signal according to the mode information. Specific examples of the input signal selection corresponding to the mode information will be described.

When the reproduction mode is set and the audio signal is actually reproduced, the mode switching unit 14 further sets a first display mode for displaying the audio signal I1. The input signal selecting unit 112 selects the audio signal I1 based on the mode information representing the first display mode.

When the broadcast reception mode is set as the reproduction mode and the frequency band received by the tuner 12 is changed according to the operation, or the like of the user, the mode switching unit 14 further sets a second display mode for displaying the received frequency signal I5. The input signal selecting unit 112 selects the received frequency signal I5 based on the mode information representing the second display mode.

When the recordation mode is set and the recording process on the recording medium is not proceeding, the mode switching unit 14 further sets a third display mode for displaying the used capacity signal I3. The input signal selecting unit 112 selects the used capacity signal I3 based on the mode information representing the third display mode.

When the recordation mode is set and the recording process on the recording medium is actually proceeding, the mode switching unit 14 further sets a fourth display mode for displaying the progress state signal I4. The input signal selecting unit 112 selects the progress state signal I4 based on the mode information representing the fourth display mode.

As illustrated above, the input signal selecting unit 112 selects the input signal based on the mode information, where numerous variations can be presumed for such selection. The mode switching unit 14 may, according to the operation state of the reproducing apparatus 10, automatically set the display mode for displaying the input signal corresponding to the relevant operation state. The mode switching unit 14 may, according to the operation of the user, set the display mode for displaying the input signal corresponding to the relevant operation. The input signal selecting unit 112 selects the input signal based on the set display mode. When the display mode is not set, for example, the input signal selecting unit 112 selects the audio signal if in the reproduction mode, and selects the progress state signal if in the recordation mode.

The gain acquiring unit 113 acquires gain information representing the gain of the audio signal from the amplification unit 16. When other input signals are to be amplified, the gain acquiring unit 113 can acquire the gain thereof, but a case in which the gain acquiring unit 113 acquires only the gain of the audio signal will be described in the present embodiment.

The meter control unit 120 acquires the input signal selected by the input signal selecting unit 112, and controls the position of the indication needle 102 based on such input signal, or the like. To this end, the meter control unit 120 outputs a drive signal of a predetermined number of steps to the stepping motor 131 to drive the stepping motor 131. The meter control unit 120 will be hereinafter described.

The stepping motor (stepper motor) 131 is a drive source of the indication needle 102, and is rotated by the number of steps corresponding to the drive signal (pulse voltage) provided by the meter control unit 120. The rotation force is transmitted to the indication needle 102 through the gear unit 132, and the indication needle 102 is rotated as a result. Such stepping motor 131 can be accurately rotated by the number of steps corresponding to the drive signal, and has a large rotation force (power) in such case. The stepping motor 131 is desirably applied with excitation current during the operation. In this case, the stepping motor 131 can have the position accurately controlled by the number of pulses of the drive signal, and thus the meter control unit 120 can grasp the position of the indication needle 102 without measuring the position of the indication needle 102 during the operation.

The gear unit 132 is configured by combining a plurality of rotatable gears, and converts the rotation amount of the stepping motor that rotates in one step to the rotation amount of the indication needle 102. For instance, when the stepping motor 131 rotates 180 in one step, the rotation amount of the indication needle 102 in one step can be reduced to smaller than or equal to 1° by setting the gear ratio of the gear unit 132 to 20 times. The rotation force of the stepping motor can be increased and transmitted to the indication needle 102 by setting such high gear ratio.

The sensors 141 and 142 are sensors for detecting the indication needle 102, and are respectively arranged at both ends of the rotatable range of the indication needle 102 (i.e., as shown in FIG. 4, one end at reference position $\theta 0$ and other end at terminating end position $\theta 1$). In other words, the sensor 141 detects that the indication needle 102 has reached the reference position $\theta 0$, and the sensor 142 detects that the indication needle 102 has reached the terminating end position $\theta 1$. Various sensors for detecting the indication needle 102 such as mechanical contact switch and sensor using light or magnetic field may be used as the sensors 141 and 142. A case of arranging two sensors 141 and 142 is described in the present embodiment, but two or more of such sensors may be arranged. The detected signal of the sensor 141 and 142 is output to the position detecting unit 143, and the position detecting unit 143 specifies the position of the indication needle 102 based on such detected signal.

The display control unit 150 causes the meter display unit 101 to perform a predetermined display based on the operation mode set by the mode switching unit 14 and the input signal selected by the input signal selecting unit 112. A needle display unit (not shown) is also provided in the indication needle 102, and the display control unit 150 causes the needle display unit to perform a predetermined display according to the operation mode and the input signal. For instance, the user can recognize the position of the indication needle 102 even under a dark environment by lightening the needle display unit. In the case of the coil type meter device in which the stepping motor is not used as the power source as in the present embodiment, the power generated by the coil and the magnet is small, and it is difficult to provide such needle display unit in the indication needle. Consideration is made in increasing the magnetic field generated in the coil and the magnetic field of the magnet in order to enhance the power and provide the needle display unit. However, in this case, the increased magnetic field influences FL (Fluorescent Lamp) tube, liquid crystal, control circuit, and the like used in the display unit 18 and the meter display unit 101. Furthermore, the error of the magnetic field also becomes large by the increased amount of the magnetic field, and the precision of position control of the indication needle might further lower. However, the meter device according to the present embodiment can ensure a large power by using the stepping motor 131, and can lighten the indication needle 102.

The display control unit 150 can also display the display of the meter display unit 101 and of the needle display unit of the indication needle 102 in conjunction with the input signal. Therefore, the meter device 100 includes such display control unit 150 to perform display representation by the backlight such as provide various displays cooperatively operating with the input signal to the user.

Meter Control Unit 120

The meter control unit 120 will now be further described in detail.

As shown in FIG. 2, the meter control unit 120 according to the present embodiment includes a step number determining part 121, a maximum movement amount determining part 122, and a drive signal generating part 123.

The step number determining part 121 determines the number of steps of the stepping motor 131 (i.e., number of pulses of the drive signal) necessary for moving the indication needle 102 by a predetermined amount. The predetermined amount is set according to the resolution of the indication needle 102, or the like. As an example of the predetermined amount, if the resolution is 1°, the step number determining part 121 determines the number of steps necessary for rotating the indication needle 102 by 1°.

When determining the number of steps, the step number determining part 121 provides the drive signal to the stepping motor 131, and rotates the indication needle 102 from the reference position $\theta 0$ to the terminating end position $\theta 1$ (see arrow M1 in FIG. 4). When the indication needle 102 is rotated, detection that the indication needle 102 has reached the reference position $\theta 0$ or the terminating end position $\theta 1$ is made by the sensors 141, 142 and the position detecting unit 143. The step number determining part 121 determines the number of steps based on the detection result (i.e., detection result of the indication needle 102 by the sensors 141 and 142) of the position of the indication needle 102 by the position detecting unit 143, and the drive signal provided when rotating the indication needle 102 between the reference position $\theta 0$ and the terminating end position $\theta 1$. That is, as shown in FIG. 4, assume a case in which the rotatable range is set to 180° and the number of steps of the drive signal provided from a state in which the sensor 141 detects the indication needle 102 until a state in which the sensor 142 detects the indication needle 102 is n steps. The step number determining part 121 determines the number of steps of the drive signal necessary for rotating the indication needle 102 by 1° as n/180 based on the detection result of the sensors 141, 142 and the drive signal (n steps) provided in between. The step number determining part 121 desirably returns the indication needle 102 back to the reference position $\theta 0$ after moving the indication needle 102 to the terminating end position $\theta 1$. The scanning within the rotatable range of the indication needle 102 is not only performed from the reference position $\theta 0$ to the terminating end position $\theta 1$, and may be performed from the terminating end position $\theta 1$ to the reference position $\theta 0$.

The step number determining part 121 may determine the number of steps when power starts to be supplied to the meter device 100 (reproducing apparatus 10). In this case, the step number determining part 121 records the determined number of steps until the power supply is stopped, and the drive signal generating part 123 and the like may provide the drive signal to the stepping motor 131 based on such number of steps. However, the timing at which the step number determining part 121 determines the number of steps is not limited to such example, and may be when the mode is switched, when switched to a predetermined mode such as reproduction mode, or when the power of the reproducing apparatus 10 is switched from OFF to ON although the power is being supplied.

The angle at which the indication needle 102 rotates with respect to the number of steps provided to the stepping motor 131 also changes due to change in environment state such as temperature, humidity, barometric pressure and the like, aged deterioration of the apparatus itself, and the like. That is, if the temperature is changed or the apparatus is used over a long period of time, the rotation angle of the stepping motor 131 in one step might change. In this case, the gear ratio might also change due to change in the gearing state, wear and the like of each gear of the gear unit 132. Furthermore, each meter device 100 itself may not maintain an even rotation amount with respect to one step due to error, or the like in the manufacturing stage. However, according to the meter device 100 of the present embodiment, the step number determining part 121 may scan the indication needle 102 once within the rotatable range, and the number of steps necessary for rotating a predetermined amount may be determined from the number of steps necessary for actually rotating such range. Therefore, the position of the indication needle 102 can be accurately controlled irrespective of such change in environment state, aged deterioration of the apparatus itself, manufacturing error, and the like.

Normally, when using the stepping motor 131, the number of steps necessary for moving the indication needle 102 by a predetermined amount is measured in advance, and recorded irrespective of the presence of power supply. According to the meter device 100 according to the present embodiment, such measurement may not be carried out, which leads to reduction in time, effort, and cost in manufacturing. A recording unit which can record the measurement result without being supplied with power such as non-volatile memory is not necessary, and thus the manufacturing cost can be further saved.

The maximum movement amount determining part 122 acquires the gain of the audio signal from the gain acquiring unit 113, and determines a maximum angle (also referred to as "maximum movement amount") the indication needle 102 can rotate based on the gain. The maximum movement amount is the maximum angle (e.g., maximum movement amount $\Delta\theta M$ of FIG. 5) the indication needle 102 can rotate from the reference position $\theta 0$ with respect to the gain. That is, the indication needle 102 can rotate (e.g., maximum movement position $\theta M$ of FIG. 5) within a range between the reference position $\theta 0$ and the position (also referred to as "maximum movement position") rotated from the reference position $\theta 0$ by the maximum movement angle. Here, such range is the range within the rotatable range, and is also referred to as "audio rotation range". In other words, the indication needle 102 is indicated to be rotatable within the rotatable range mechanically, but the rotation range is limited to the audio rotation range based on the gain. The audio rotation range is appropriately changed according to the gain.

An example of determining the maximum movement amount based on the gain will be specifically described below.

Figure 5:
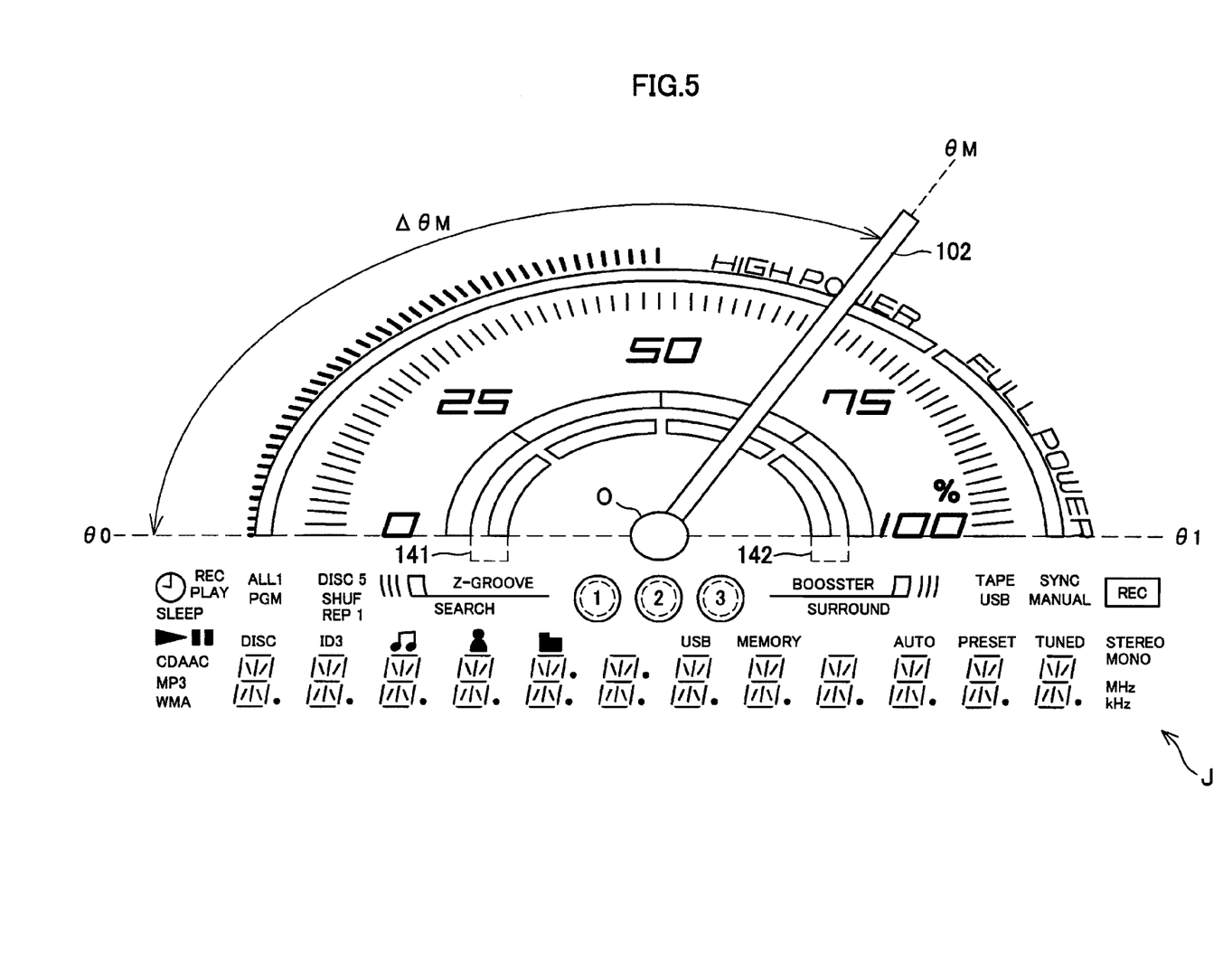
FIG. 5 is an explanatory view describing the movement of the indication needle by the meter device according to the embodiment.

In other words, the maximum gain in the amplification unit 16 is corresponded to the terminating end position $\theta 1$, and the minimum gain (e.g., 0 times) in the amplification unit 16 is corresponded to the reference position $\theta 0$. The maximum movement amount $\Delta\theta M$ between the terminating end position $\theta 1$ and the reference position $\theta 0$ is determined according to the proportion of the gain set in the amplification unit 16 between the maximum and the minimum gains. More specifically, the gain in the amplification unit 16 can be set between 0 and 18 times, and the amplification unit 16 is assumed to set the gain to 13.5 times which corresponds to about 75% of 18 times or the maximum value. The maximum movement amount determining part 122 then sets the maximum movement amount $\Delta\theta M$ to 135° which corresponds to about 75% of the rotatable range (180°).

When the maximum movement amount determining part 122 determines the audio rotation range, the swinging width of the indication needle 102, for example, can be limited to within a range corresponding to the gain. Therefore, the indication needle 102 can be operated in conjunction with not only with the amplitude value of the audio signal but also with the gain.

When the gain acquired by the gain acquiring unit 113 is changed, the maximum movement amount determining part 122 moves the indication needle 102 to the maximum movement position θM based on the number of steps determined by the step number determining part 121 and the gain acquired by the gain acquiring unit 113. When the gain is determined according to the operation of the user, for example, by moving the indication needle 102, the indication needle 102 can display the gain (i.e., volume) set at the relevant point by the user. Thus, the user can adjust the volume while referencing the indication needle 102.

The maximum movement amount determining part 122 acquires the input signal selected from the input signal selecting unit 112. The maximum movement amount determining part 122 determines the maximum movement amount ΔθM if the input signal is not the audio signal so that the audio rotation range coincides with the rotatable range (i.e., maximum movement position θM=terminating end position θ1). In other words, in the case of the present embodiment, the gain acquired by the gain acquiring unit 113 is the gain with respect to the audio signal, and the gain acquiring unit 113 does not acquire the gain with respect to other input signals. Thus, in a case the input signal selected by the input signal selecting unit 112 is other than the audio signal, the gain acquiring unit 113 does not acquire the gain with respect to such input signal. In this case, the maximum movement amount determining part 122 coincides the audio rotation range to the rotatable range, as described above. The rotation range of the indication needle is the mechanically set rotatable range, and is substantially not limited to the audio rotation range. However, the gain acquiring unit can acquire the gain with respect to other input signals. In this case, the maximum movement amount determining part 122 determines the maximum movement amount ΔθM similar to the audio signal with respect to the relevant input signal.

The drive signal generating unit 123 is one example of a drive control unit and, based on the number of steps determined by the step number determining part 121 and the amplitude value of the input signal selected by the input selecting unit 112, moves the indication needle 102 to the position corresponding to the relevant amplitude value. That is, the drive signal generating part 123 first determines the rotation angle of the indication needle 102 according to the amplitude value of the input signal. The drive signal generating part 123 then determines the number of steps of the drive signal necessary for rotating the indication needle 102 by the determined rotation angle based on the number of steps necessary for rotating the indication needle 102 by a predetermined angle. The drive signal generating part 123 generates the drive signal by the determined number of steps, and provides the drive signal to the stepping motor 131. The stepping motor 131 is rotated as a result, and the indication needle 102 is rotated by the rotation angle determined by the drive signal generating part 123.

When determining the rotation angle of the indication needle 102 according to the amplitude value of the input signal, the drive signal generating part 123 determines the rotation angle of the indication needle 102 based further on the maximum movement amount ΔθM determined by the maximum movement amount determining part 122. In this case, the drive signal generating part 123 limits the movement amount from the reference position θ0 of the indication needle 102 to smaller than or equal to the maximum movement amount Δθ. That is, the drive signal generating part 123 rotates the indication needle 102 to the position corresponding to the amplitude value of the input signal within the audio rotation range. As a method of limiting to within the audio rotation range with respect to the rotation angle of the indication needle 102, for example, the drive signal generating part 123 can simply have the upper limit value of the rotation angle as the maximum movement amount ΔθM. In this case, the drive signal generating part 123 further desirably reduces the rotation angle with respect to the amplitude value of the input signal according to the maximum movement amount ΔθM. As one example of the reducing method, the proportion of the maximum movement amount ΔθM with respect to the angle between the reference position θ0 and the terminating end position θ1 may be multiplied to the amplitude value of the input signal to reduce the amplitude value of the input signal at a specific ratio.

Furthermore, if the input signal selecting unit 112 selects an input signal other than the audio signal, the drive signal generating part 123 sets the position corresponding to the amplitude value of the input signal to within the rotatable range of the indication needle 102 without being limited to the audio rotation range. For instance, if the maximum movement amount determining part 122 is set to "maximum movement position θM=terminating end position θ1", the drive signal generating part 123 rotates the indication needle 102 within the audio rotation range to substantially move the indication needle 102 within the rotatable range. Therefore, when the input selecting unit 112 is selecting the "used capacity signal" and the used capacity of the recording medium is 25% with respect to the maximum storage capacity, the drive signal generating part 123 moves the indication needle 102 to a position of 25% in the meter display unit 101 (see FIG. 6).

Operation of Meter Device

The configuration of the meter device 100 according to one embodiment of the present invention is as described above.

Figure 3:
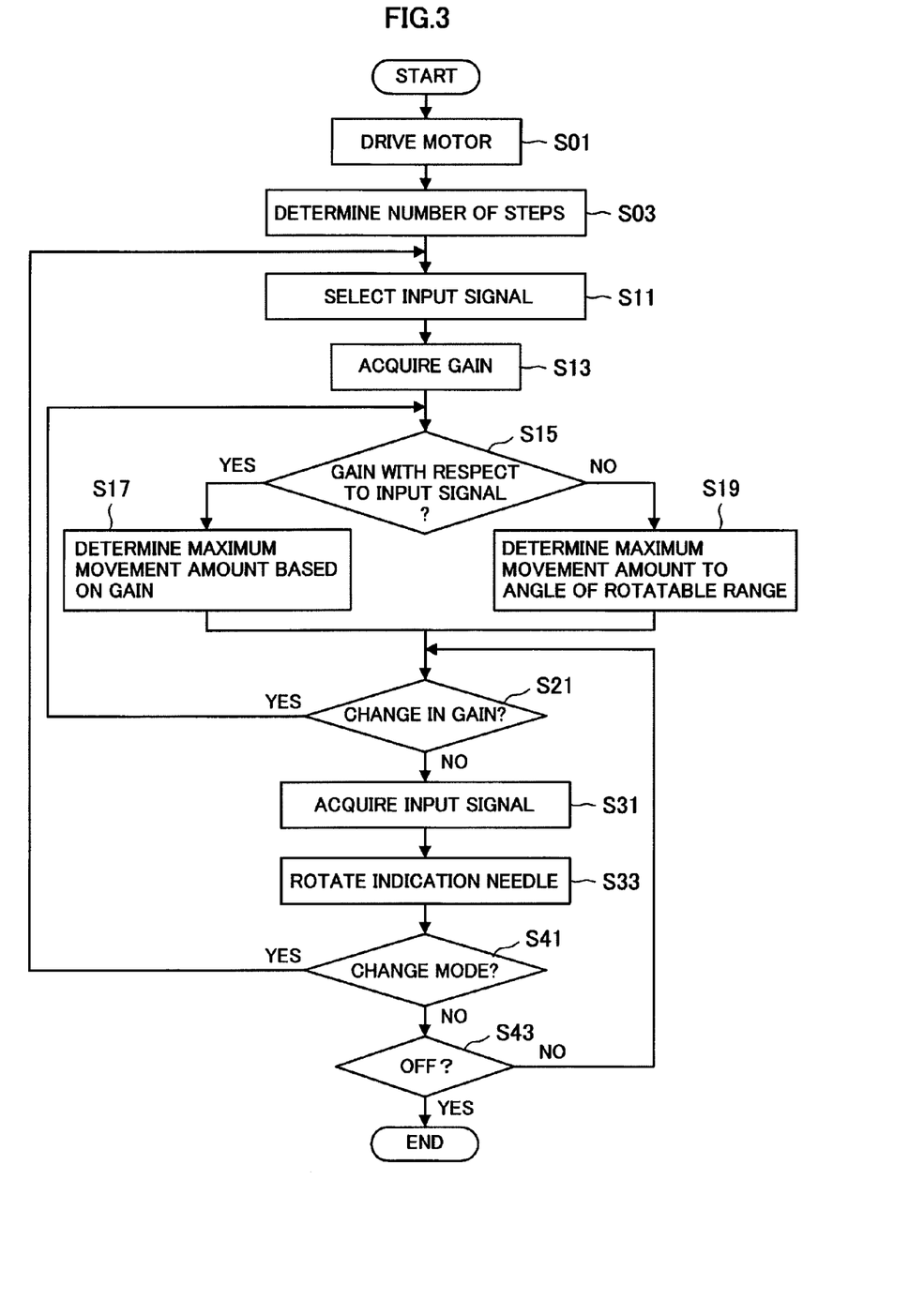
FIG. 3 is an explanatory view describing an operation of the meter device according to the embodiment.

The operation of the meter device 100 will now be described with reference to FIG. 3. FIG. 3 is an explanatory view for describing the operation of the meter device according to the present embodiment.

First, step S01 and step S03 are executed when the power is supplied from the state in which the power is not being supplied to the meter device 100, and the power of the reproducing apparatus 10 is turned ON. That is, in step S01, the step number determining part 121 provides the drive signal to the stepping motor 131 and rotates the indication needle 102 within the rotatable range. Detection that the indication needle 102 has reached the reference position θ0 and the terminating end position θ1 is made by the sensors 141 and 142. Step S03 is then executed, and the step number determining part 121 determines the number of steps necessary for rotating the indication needle by a predetermined angle based on the number of steps of the drive signal provided between the detection of the indication needle 102 by the sensor 141 and the detection of the indication needle 102 by the sensor 142. The process then proceeds to step S11

However, step S01 and step S03 are executed at a predetermined timing such as when power is supplied, when mode is switched, and the like, as described above. Therefore, step S01 and step S03 may be omitted when the step number determining part 121 has already determined the number of steps and recorded such number of steps. In this case, processes of step S11 and subsequent steps are performed at a timing the power of the reproducing apparatus 10 is turned ON.

In step S11, the input signal selecting unit 112 selects the input signal to be displayed by the indication needle 102 based on the mode information and the like. The process then proceeds to step S13.

In step S13, the gain acquiring unit 113 acquires the gain set in the amplification unit 16. The process then proceeds to step S15 (one example of gain acquiring step).

In step S15, the maximum movement amount determining part 122 checks whether or not the gain acquired by the gain acquiring unit 113 is for the input signal selected by the input signal selecting unit 112. In the case of the present embodiment, the gain acquiring unit 113 acquires only the gain with respect to the audio signal. Thus, the process of step SI5 in the present embodiment can be replaced with a process of simply checking whether or not the input signal selected by the input signal selecting unit 112 is an audio signal. The process then proceeds to step S17 if the input signal is the audio signal, and the process proceeds to step S19 if the input signal is not the audio signal.

In step S17, the maximum movement amount determining part 122 determines the maximum movement amount $\Delta\theta M$ or the maximum movement amount from the reference position $\theta 0$ of the indication needle 102 according to the gain (one example of maximum movement amount determining step).

In step S19, the maximum movement amount determining part 122 sets the maximum movement amount $\Delta\theta M$ to the angle of the rotatable range. That is, in this case, the maximum movement amount determining part 122 sets the maximum movement position $\theta M$ of the indication needle 102 to the terminating end position $\theta 1$, and enables the indication needle 102 to be rotatable over the entire region of the rotatable range. The process proceeds to step S21 after the processes of step S17 and S19.

In step S21, the maximum movement amount determining part 122 checks whether or not the gain acquired by the gain acquiring unit 113 has changed. If the gain has changed, processes of step S15 and thereafter are again performed. When proceeding from the process of step S21 to steps S15 and step S17, the maximum movement amount determining part 122 desirably moves the indication needle 102 once to a position moved from the reference position $\theta 0$ by the maximum movement amount $\Delta\theta M$ in step S17. The currently set volume (gain) can be notified to the user by moving the indication needle 102. When proceeding from the process of step S21 to step S15 and step S19, a process for causing the indication needle 102 to display the volume may be performed similar to the above. The process proceeds to step S31 if the gain is not changed.

In step S31, the drive signal generating part 123 acquires the input signal selected by the input signal selecting unit 112. The process then proceeds to step S33.

In step S33, the drive signal generating part 123 generates the drive signal to rotate the stepping motor 131, and rotates the indication needle 102 to a position corresponding to the amplitude value of the input signal (one example of drive step). The position of the indication needle 102 to be moved by the drive signal generating part 123 is limited to within a range of the maximum movement amount $\Delta\theta M$ set in step S17 or step S19, that is, to within the range from the reference position $\theta 0$ to the maximum movement position $\theta M$. Therefore, the indication needle 102 can be moved within the audio rotation range (between reference position $\theta 0$ and the maximum movement position $\theta M$) smaller than the rotatable range if after the process of step S17. The indication needle 102 can be substantially moved within the rotatable range if after the process of step S19. The process then proceeds to step S41.

In step S41, the input signal selecting unit 112 checks whether or not the mode represented by the mode information acquired from the mode switching unit 14 has been changed. The processes of step S11 and subsequent steps are again performed if the mode is changed, and the process proceeds to step S43 if the mode is not changed.

In step S43, the meter control unit 120 checks whether or not the power of the reproducing apparatus 10 is turned OFF. The meter device 100 terminates the operation when the power is switched to OFF, and the processes of step S21 and subsequent steps are repeated when the power is not switched to OFF. Therefore, when the processes of step S21 and subsequent steps are repeated, the indication needle 102 is sequentially rotated within the audio rotation range (substantially within the rotatable range if step S19 is processed) according to the amplitude of the input signal.

Movement of Indication Needle

The operation of the meter device 100 according to one embodiment of the present invention will now be described. The movement of the indication needle 102 of when the above operation is performed will be described with reference to FIGS. 4 to 6. When the power of the reproducing apparatus 10 is turned ON, and step S01 and step S03 are executed, the indication needle 102 first rotates from the reference position $\theta 0$ to the terminating end position $\theta 1$, as shown with an arrow M1 of FIG. 4. Subsequently, the indication needle 102 returns from the terminating end position $\theta 1$ to the reference position $\theta 0$, as shown with an arrow M2 of FIG. 4. The step number determining part 121 determines the number of steps through such operation.

Step S17 is executed when the input signal selecting unit 112 selects the audio signal. As shown in FIG. 5, the maximum movement amount $\Delta\theta M$ from the reference position $\theta 0$ of the indication needle 102 is limited to the position corresponding to the gain by the maximum movement amount determining part 122.

Subsequently, when the processes of step S31, S33, and the like are repeated, the indication needle 102 is sequentially moved to a position corresponding to the amplitude value of the input signal between the reference position $\theta 0$ and the maximum movement position $\theta M$. Thus, when the amplitude value of the input signal increases or decreases, the indication needle 102 swings by an angle corresponding to such increase or decrease within the audio rotation range. In this case, the gain of the amplification unit 16 changes when the user changes the volume of the reproducing apparatus 10. Step S15, S17, and the like are then executed after the process of step S21. In this case, the indication needle 102 is rotated by the maximum movement amount $\Delta\theta M$ from the reference position $\theta 0$ in step S17, as shown in FIG. 5. Therefore, the indication needle 102 can display the set volume by being positioned at the maximum movement position $\theta M$.

Figure 6:
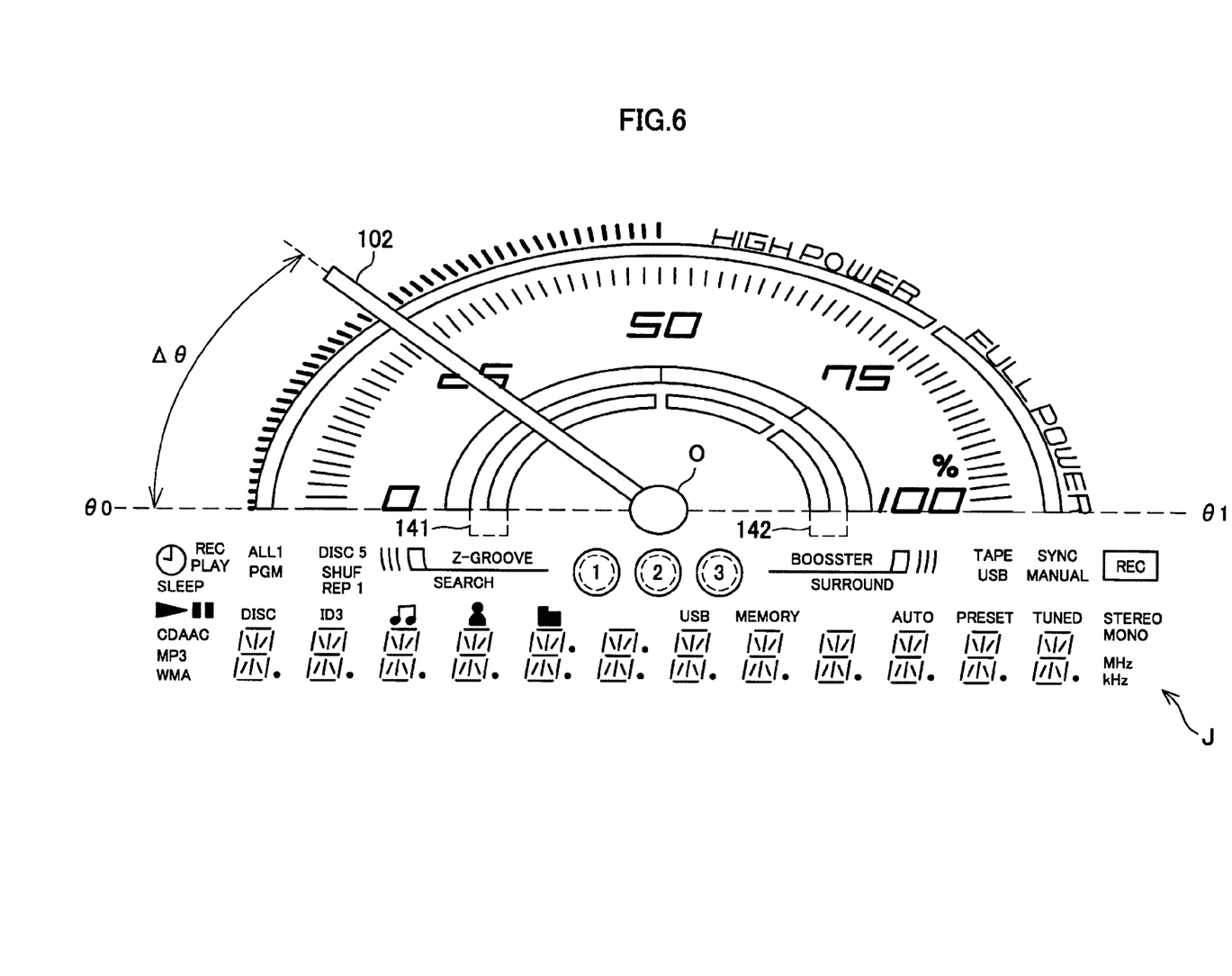
FIG. 6 is an explanatory view describing the movement of the indication needle by the meter device according to the embodiment.

Step S19 is executed in place of step S17 if the input signal selecting unit 112 selects the "used capacity signal" and the like. As shown in FIG. 6, the movement range of the indication needle 102 is set to the rotatable range by the maximum movement amount determining part 122. The indication needle 102 is moved by an angle $\Delta\theta$ representing the proportion of the used capacity with respect to the maximum storage capacity of the recording medium represented by the amplitude value of the used capacity signal from the reference position $\theta 0$ by processes of step S31, S33, and the like. Therefore, in this case, the indication needle 102 can display the used capacity of the recording medium by the relevant position. The indication needle 102 can similarly display information representing the respective input signal for other input signals.

Example of Effect by Meter Device

The meter device 100 and the reproducing apparatus 10 equipped with the meter device 100 according to one embodiment of the present invention has been described above. According to such meter device 100, the rotation range of the indication needle 102 is limited according to the gain thereof in the case of the amplified input signal such as the audio signal. Therefore, the meter device 100 can rotate the indication needle 102 in conjunction not only with the gain of the input signal but also with the gain thereof. The meter device 100 thus can also notify the gain to the user. The meter device 100 can accurately control the stopping position of the indication needle 102 by rotating the indication needle 102 based on the gain.

Furthermore, the meter device 100 can control the stopping position more accurately by using the stepping motor 131 as a drive source of the indication needle 102. In particular, since the meter device 100 can determine the number of steps with respect to the stepping motor 131 using the sensors 141 and 142, the indication needle 102 can be moved to an accurate position without being influenced by environment change, aged deterioration, manufacturing error, and the like. When using the stepping motor 131 having high power and setting the gear unit 132 to high gear ratio, the meter device can provide the needle display unit, or the like in the indication needle 102, and a greater variety of information can be provided and a display layout of high variation can be set. The stepping motor 131 operates while being applied with the excitation current, and high reduction ratio can be ensured by using the gear unit 132. As a result, the necessity to perform feedback control of monitoring the position of the indication needle 102 while representing the amplitude value of the input signal with a sensor, or the like can be eliminated. The feedback circuit thus may not be used, and the manufacturing cost can be further reduced.

Moreover, the meter device 100 can have the indication needle 102 display various information other than the audio signal such as change in gain, remaining capacity of the recording medium, progress state of reproduction or recordation, received frequency band, and the like. Thus, the meter device 100 can also serve as an intelligent meter capable of providing various information to the user.

Moreover, the meter device 100 incorporates the meter display unit 101 or the needle display unit, and such display units can perform various displays according to the mode information, the input signal, and the like. Therefore, the meter device 100 can realize various display representation functions. The degree of freedom with respect to the design of the indication needle 102 and the meter display unit 101 is also high. For instance, if the meter display unit 101 also serves as a backlight, the arrangement area of the backlight is not ensured, and limitation in space on the operation range of the indication needle 102 can be reduced. In the present embodiment, a case in which the rotatable range is set between 0° and 180° has been described, but the operation range of the indication needle 102 may be changed to achieve an operation for rotating greater than or equal to 360°.

It should be understood by those skilled in the art that various modifications, combinations, sub-combinations and alterations may occur depending on design requirements and other factors insofar as they are within the scope of the appended claims or the equivalents thereof.

In the embodiment described above, the indication needle 102 that rotates with the center O as the rotation axis has been described by way of example as the indicator unit. However, the present invention is not limited to such example. The indicator unit may be formed to move on a straight line, or may be formed to move on other various paths. In this case, the gear unit 132, or the like can convert the rotation force of the stepping motor 131 to the movement force along the path thereof.

In the embodiment described above, a case in which the used capacity signal and the like, which are input signals other than the audio signal, is acquired from outside (e.g., recording control unit 15, or the like) the meter device 100 has been described. However, the present invention is not limited to such example. The meter device 100 can internally calculate the used capacity signal. In this case, the meter device 100 may include an input signal calculating unit (not shown). The input signal calculating unit acquires information representing the maximum storage capacity and the used capacity of the recording medium from the recording control unit 15, or the like when calculating the used capacity signal. The input signal calculating unit may calculate the used capacity signal based on the maximum storage capacity and the used capacity, and the input signal acquiring unit 111 may acquire the calculation result.

In the embodiment described above, the reproducing audio signal has been given by way of example as the amplifying input signal, but the present invention is not limited to such example. In other words, the amplifying input signal includes audio signal, or the like recorded on the recording medium etc. Therefore, the meter device 100 can display the amplitude value of the audio signal in conjunction with the gain on the recorded audio signal.

Moreover, in the embodiment described above, a case of providing the position detecting unit 143 has been described as shown in FIG. 2, but the present invention is not limited to such example. The step number determining part 121 may also serve as the position detecting unit 143. In this case, the position detecting unit 143 can be omitted, and the step number determining part 121 can directly acquire the detection result from the sensors 141 and 142.

In the present specification, the steps described in the flowchart include, in addition to the processes performed in time series in the described order, processes executed in parallel or individually which may not be processed in time series. Needless to say, the order of steps processed in time series may be appropriately changed depending on the condition.

What is claimed is:

1. A meter device comprising:
   an indicator unit, having a movable range between a reference position and terminating end position, movement of the indicator unit representing an amplitude value of an input signal by a movement amount from the reference position;
   a gain acquiring unit for acquiring a gain of the input signal, the gain of the input signal being between a predetermined minimum value and a predetermined maximum value;
   a maximum movement amount determining part for determining a maximum movement amount of the indicator unit based on the gain acquired by the gain acquiring unit compared to the predetermined maximum gain; and
   a drive control unit for moving the indicator unit to a position corresponding to the amplitude value of the input signal between the reference position and a maximum movement position moved from the reference position by the maximum movement amount based on the maximum movement amount determined by the maximum movement amount determining part and the amplitude value of the input signal.

2. The meter device according to claim 1, further comprising a stepping motor for moving the indicator unit;

wherein the drive control unit moves the indicator unit by outputting a drive signal to the stepping motor by a predetermined number of steps.

3. The meter device according to claim 1, wherein when the gain acquired by the gain acquiring unit is changed and the maximum movement amount determined by the maximum movement amount determining part is changed, the drive control unit moves the indicator unit once to a maximum movement position moved from the reference position by the maximum movement amount.

4. The meter device according to claim 2, further comprising:
at least two sensors, a first sensor arranged at the reference position or one end of a predetermined range and a second sensor arranged at the terminating end position, to detect when the indicator unit reaching one end or the terminating end position; and
a step number determining part for providing a drive signal to the stepping motor and moving the indicator unit in the movable range in time of activation, and determining the number of steps of the stepping motor necessary for moving the indicator unit by a predetermined amount based on the detection results of the at least two sensors and the provided drive signal.

5. The meter device according to claim 1, further comprising:
an input signal selecting unit for selecting an input signal to be displayed by the indicator unit from a plurality of input signals;
wherein when a gain on the input signal selected by the input signal selecting unit is not acquired by the gain acquiring unit, the drive control unit moves the indicator unit to a position corresponding to the amplitude value of the input signal between the ends of the movable range based on the amplitude value of the input signal selected by the input signal selecting unit.

6. An information processing device comprising:
a reproducing unit for reproducing an audio signal;
an amplification unit for amplifying the audio signal reproduced by the reproducing unit;
an indicator unit, having a movable range between a reference position and terminating end position, movement of the indicator unit representing an amplitude value of the audio signal amplified by the amplification unit by a movement amount from the reference position which is one end of the movable range;
a gain acquiring unit for acquiring a gain of the audio signal from the amplification unit, the gain of the audio signal being between a predetermined minimum value and a predetermined maximum value;
a maximum movement amount determining part for determining a maximum movement amount of the indicator unit based on the gain acquired by the gain acquiring unit compared to the predetermined maximum gain; and
a drive control unit for moving the indicator unit to a position corresponding to an amplitude value of the audio signal between the reference position and a maximum movement position moved from the reference position by the maximum movement amount based on the maximum movement amount determined by the maximum movement amount determining part and the amplitude value of the audio signal.

7. The information processing device according to claim 6, further comprising:
an input signal acquiring unit for acquiring a plurality of input signals including the audio signal; and
an input signal selecting unit for selecting an input signal to be displayed by the indicator unit from the plurality of input signals acquired by the input signal acquiring unit;
wherein when the input signal selecting unit selects an input signal other than the audio signal, the drive control unit moves the indicator unit to a position corresponding to the amplitude value of the input signal between the ends of the movable range based on the amplitude value to display the amplitude value of the input signal selected by the input signal selecting unit on the indicator unit.

8. The information processing device according to claim 7, wherein the input signal acquiring unit acquires, from a recording medium arranged inside or outside the information processing device, an input signal in which a used capacity of the recording medium is represented with an amplitude value; and
when the input signal selecting unit selects the input signal in which the used capacity of the recording medium is represented with the amplitude value, the drive control unit moves the indicator unit to a position corresponding to the used capacity of the recording medium between the ends of the movable range based on the input signal.

9. A meter driving method comprising the steps of:
acquiring a gain of an input signal, the gain of the input signal being between a predetermined minimum value and a predetermined maximum value;
determining a maximum movement amount of an indicator unit, the indicator unit having a movable range between a reference position and terminating end position, movement of the indicator unit representing an amplitude value of the input signal by a movement amount from the reference position,
wherein the maximum movement amount of the indicator unit is based on the gain acquired by the gain acquiring unit compared to the predetermined maximum gain; and
moving the indicator unit to a position corresponding to the amplitude value of the input signal between the reference position and a maximum movement position moved from the reference position by the maximum movement amount based on the maximum movement amount determined in the maximum movement amount determining step and the amplitude value of the input signal.

* * * * *